United States Patent
Yamashita et al.

(10) Patent No.: US 6,503,676 B2
(45) Date of Patent: Jan. 7, 2003

(54) TONER, EXTERNAL ADDITIVE THEREFOR AND IMAGE FORMING METHOD USING THE TONER

(75) Inventors: Hiroshi Yamashita, Numazu (JP); Tomio Kondou, Numazu (JP); Hideki Sugiura, Fuji (JP); Hachiroh Tosaka, Shizuoka-ken (JP); Osamu Uchinokura, Shizuoka-ken (JP); Hitoshi Ueda, Fuji (JP); Yoshihiro Suguro, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/843,357

(22) Filed: Apr. 26, 2001

(65) Prior Publication Data

US 2001/0051270 A1 Dec. 13, 2001

(30) Foreign Application Priority Data

| Apr. 28, 2000 | (JP) | 2000-129240 |
| May 2, 2000 | (JP) | 2000-133850 |
| Sep. 29, 2000 | (JP) | 2000-299739 |

(51) Int. Cl.$^7$ ............................................. G03G 9/113
(52) U.S. Cl. ......................... 430/108.3; 430/108.6; 430/45; 428/405
(58) Field of Search ................. 430/108.6, 108.3, 430/107.1, 110.3; 428/45, 405

(56) References Cited

U.S. PATENT DOCUMENTS

| 5,994,016 A | 11/1999 | Kuramoto et al. | 430/110 |
| 6,004,715 A | 12/1999 | Suzuki et al. | 430/111 |
| 6,106,986 A * | 8/2000 | Shirni et al. | 430/106 |
| 6,187,496 B1 * | 2/2001 | Tanikawa et al. | 430/137.11 |

FOREIGN PATENT DOCUMENTS

| EP | 0410482 | 1/1991 |
| EP | 0658819 | 6/1995 |

OTHER PUBLICATIONS

U.S. patent application Ser. No. 09/541,630, filed Apr. 3, 2000.
U.S. patent application Ser. No. 09/643,910, filed Aug. 23, 2000.
Patent Abstracts of Japan, Abstract of Japanese Published Application 07271087 A, Oct. 20, 1995 (Shinichi et al.).
Patent Abstracts of Japan, Abstract of Japanese Published Application 08029598 A, Feb. 2, 1996 (Yoshimasa et al.).
Patent Abstracts of Japan, Abstract of Japanese Published Application 11212299 A, Aug. 6, 1999 (Hiroshi et al.).
Patent Abstracts of Japan, Abstract of Japanese Published Application 61277964 A, Dec. 8, 1986 (Hitoshi).
Patent Abstracts of Japan, Abstract of Japanese Published Application 01253780 A, Oct. 11, 1989 (Tetsuya et al.).

* cited by examiner

*Primary Examiner*—John Goodrow
(74) *Attorney, Agent, or Firm*—Cooper & Dunham LLP

(57) ABSTRACT

A toner including a binder resin; a colorant; and an external additive, wherein the external additive includes a particulate inorganic material, and a silicone oil, wherein the silicone oil is present on the particulate inorganic material in an amount of Ws by weight and present as a free silicone oil in an amount of Wfs by weight, and a free silicone degree defined as a ratio Wfs/Ws is from 10 to 70%.

44 Claims, 2 Drawing Sheets

TONER, EXTERNAL ADDITIVE THEREFOR AND IMAGE FORMING METHOD USING THE TONER

BACKGROUND OF THE INVENTION

1. Field of the Invention

The present invention relates to a toner used for a developer for developing an electrostatic latent image formed by an image forming method such as electrophotography, electrostatic recording methods and electrostatic printing methods. In addition, the present invention relates to an external additive for use in the toner, and to an image forming method using the toner.

2. Discussion of the Related Art

Developers used for developing an electrostatic latent image formed by an image forming method such as electrophotography, electrostatic recording methods and electrostatic printing methods are classified into two component developers consisting of a carrier and a toner, and one component developers which include only a toner and do not include a carrier. The one component developers are also classified into one component magnetic developers and one component non-magnetic developers. In addition, toners are also classified into positively-charged toners and negatively-charged toners.

In order to improve the fluidity and charge properties of toner, an inorganic powder such as metal oxides is typically included in a toner while the inorganic powder is mixed with the toner particles. Such an inorganic powder is called as an external additive. As the external additive, silicone dioxide (i.e., silica), titanium dioxide (titania), aluminum oxide (alumina), zinc oxide, magnesium oxide, cerium oxide, iron oxide, copper oxide, tin oxide and the like metal oxides are known.

In order to improve the hydrophobic property of the surface of such inorganic powders and the charge properties thereof, various methods have been proposed. In particular, methods in which silica powders are reacted with an organic silicon compound such as dimethyldichlorosilane, hexamethylenedisilazane and silicone oils to substitute the silanol groups on the surface of the silica powders with an organic group are popularly used.

Among these organic silicon compounds, silicone oils are preferable as the hydrophobizing agent because of having good hydrophobic property and low surface energy, thereby imparting good transferability to the resultant toner. Therefore various proposals regarding silicone oils have been made. For example, Japanese Laid-Open Patent Publications Nos. 7-271087 and 8-29598 have disclosed developers which include an additive having a specific carbon content and a specific silicone oil content to improve the charge stability of the resultant developer under high humidity conditions.

However, the developers including such additives including a silicone oil have the following drawbacks:

(1) the resultant images tend to have background fouling, and omissions in the edge parts and/or center parts of character images, line images and dot images, which omissions are caused by unsatisfactory image transfer from an image bearing member to a receiving material; and (2) when an image is formed on a receiving material having a rough surface, the image tends to have omissions which are typically observed in the recessed portions of the surface of the rough receiving material.

In attempting to remedy the drawbacks, Japanese Laid-Open Patent Publication 11-212299 discloses an external additive in which a specific amount of a liquid silicone oil is included in a particulate inorganic material. However, the drawbacks cannot fully remedied.

On the other hand, currently, a need exists for copiers and printers which can produce images having qualities as high as those of the prints produced by offset printing methods at a recording speed as high as that of the offset printing methods. When images are formed on only one side of receiving material, fairly high speed copying or printing can be achieved. However, when images are formed on both sides of a recording paper, the copying or printing speed is much slower than that in the one-side printing. In particular, when a double-sided copy is produced by forming and fixing a toner image on one side of a receiving material and then forming and fixing another toner image on the other side of the receiving material, the recording time is about twice the recording time needed for producing a one-side copy.

Therefore, an image forming method, in which toner images are continuously transferred on both sides of a receiving material by two image bearing members which are arranged at different positions in the vertical direction as shown in FIG. 1 and the thus prepared double-sided toner images are then fixed at the same time has been proposed.

The image transfer method of the image forming method is classified into two types with respect to the method for driving the image bearing members. One of the types is to drive the image bearing members using a motor or a belt (this method is hereinafter referred to as a motor-drive method). The other is to drive the image bearing members using friction between the image bearing members and a receiving material without providing a rotation mechanism (hereinafter referred to as a paper-drive method).

In the motor-drive method, it is difficult to control the timing of transferring toner images on both sides of a receiving material. In order to accurately transfer images on both sides of a receiving material, the image forming apparatus has to have precise and complex mechanisms, resulting in increase of manufacturing costs and enlargement in size of the image forming apparatus. In particular, in multiple color image forming apparatus a problem of difference in positions between the transferred color toner images (hereinafter referred to as color image offset), in which color toner images constituting a color image do not have accurate positions in one side of a receiving material, occurs as well as a problem of variation of transfer timing of a color image (hereinafter referred to as transfer timing variation), in which an entire color image is formed on an undesired position of a receiving material. The costs of providing a mechanism for preventing these problems are much greater than those needed for monochrome image forming apparatus.

The paper-drive method will be explained referring to FIG. 1 which illustrates a typical embodiment of a paper-drive type image transfer mechanism.

In this method, a receiving material 1 is contacted with an image bearing member 2a on which a toner image 5a is formed to drive the image bearing member 2a while the toner image 5a is transferred on one side of the receiving material 1 by a transfer member 3a. In addition, the receiving material 1 is contacted with another image bearing member 2b on which a toner image 5b is formed to drive the image bearing member 2b while the toner image 5b is transferred on the other side of the receiving material 1 by a transfer member 3b.

In the paper-drive method, image bearing members are driven by friction and/or electrostatic force between the image bearing members and a receiving material. Namely, the image bearing members are driven by the receiving material, and therefore, it is relatively easy to time the development and transfer operations with the feeding operation of the receiving material compared to the former method, and thereby the problems such as the color image offset and transfer timing variation hardly occur. Therefore the image forming apparatus can be simplified.

However, since the receiving material is contacted with the image bearing member, toner images sandwiched by the receiving material and the image bearing member receives a large pressure by the receiving material. Therefore the adhesion of the toner images to the image bearing member increases, and thereby omissions tend to be produced in the resultant transferred toner images, particularly in edge parts or center parts of the transferred character images, line images and dot images.

In attempting to solve this image omission problem, toners including an additive such as particulate inorganic materials e.g., silica and titanium oxide, have been proposed. However, such toners cannot fully solve the problem. Namely, when such an additive is included in a toner in a large amount to solve the image omission problem, the resultant toner images have poor fixing properties. Therefore it is difficult to prepare a toner capable of producing images having good image qualities (i.e., good images without image omissions) without deteriorating good fixing properties.

Because of these reasons, a need exists for a toner which can produce images having good image qualities and good fixing property even when used for the paper-drive image forming method.

SUMMARY OF THE INVENTION

Accordingly, an object of the present invention is to provide a toner which can produce images having good image qualities and good fixing property without causing image omissions even when used for paper-drive image forming method.

Another object of the present invention is to provide an external additive for the above-mentioned toner.

Yet another object of the present invention is to provide an image forming method by which images having good image qualities and good fixing property can be stably produced without causing image omissions even when images are formed for a long period of time.

To achieve such objects, the present invention contemplates the provision of a toner including a binder resin, a colorant and an external additive, wherein the external additive includes a particulate inorganic material and a silicone oil, and wherein the silicone oil has a free silicone degree of from 10 to 70%. At this point, the free silicone degree is defined as follows:

Free silicone degree (%)=$(Wfs/Ws)\times 100$ wherein Wfs represents the weight of the free silicone oil and Ws represents the weight of the silicone oil present on the inorganic material.

The free silicone degree is preferably from 30 to 50%. In addition, the inorganic material is preferably silica, titanium oxide or a combination thereof.

The inorganic material is preferably treated by the silicone oil upon application of heat. In addition, the toner preferably has a spherical degree not less than 0.93, and a weight average particle diameter not greater than 15 $\mu$m.

Preferably, the toner is a combination of a cyan toner, a magenta toner, a yellow toner and a black toner, and at least one of the toners is the toner mentioned above.

In another aspect of the present invention, an external additive for a toner is provided which includes a particulate inorganic material and a silicone oil, and wherein the silicone oil has a free silicone degree of from 10 to 70%.

In yet another aspect of the present invention, a developer is provided which includes a magnetic carrier and the toner of the present invention.

In a further aspect of the present invention, an image forming method including the steps of forming a toner image on an image bearing member with a developer including the toner of the present invention; transferring the toner image on a receiving material upon application of pressure; and then heating the toner image on the receiving material to fix the toner image. The toner image forming step may be repeated plural times to form a full color image on the image bearing member or an intermediate transfer medium. The full color image is then transferred on the receiving material. Alternatively, the toner image forming step may be performed using plural image bearing members to form respective color images thereon.

The image transferring step preferably uses a paper-driven image transferring method, and the image fixing step preferably uses a non-contact heat fixing method.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Figure 1:
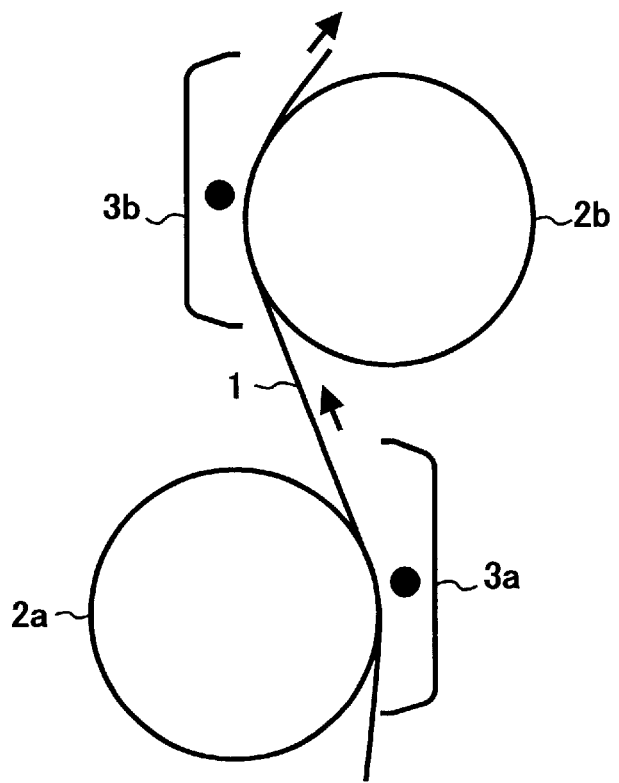
FIG. 1 is a schematic diagram illustrating an embodiment of the paper-drive image forming method for use in the image forming method of the present invention.

The present inventors try to solve the above-mentioned problems by using a toner including a silicone oil, which has a relatively low surface energy. As a result, it is discovered that the free silicone degree largely influences on the image qualities of the resultant toner images, especially on image omissions.

Namely, it is found that when an external additive includes a particulate inorganic material and a silicone oil having a free silicone degree of from 10 to 70%, and preferably from 30 to 50%, is used in a toner, the resultant toner images have good images without image omissions.

As the particulate inorganic material, at least one of silica and titanium oxide is preferably used.

It is preferable to treat the particulate inorganic material with a silicone oil upon application of heat.

When the particulate inorganic material is treated with a silicone oil, it is preferable that the coating treatment is performed while applying heat thereto or a heat treatment is additionally performed after the coating treatment.

By controlling the free silicone degree so as to fall in the range of from 10 to 70%, good images without omissions can be produced on various receiving materials such as rough or smooth receiving materials. The reason is considered to be as follows.

When a free silicone oil is present in a toner, the free silicone oil is continuously applied to the image bearing member. The free silicone oil is spread on the entire surface of the image bearing member because of having low surface energy, resulting in decrease of the friction coefficient of the image bearing member.

In addition, the free silicone oil increases the adhesion of a toner particle, which is surrounded by the additive, to other toner particles, and further decreases the adhesion of the toner particle to the image bearing member. In general, toner particles tend to adhere to character, line and dot latent images in a greater amount than center areas of solid images. Therefore, the resultant toner images of such character, line and dot images are pressed by a receiving material at a greater pressure than the other toner images, resulting in occurrence of omissions in the resultant character, line and dots toner images. The reason is considered to be that the adhesion of the toner images to the image bearing member is increased and therefore the toner images cannot be easily transferred by the electric transfer field applied to the toner images. When the free silicone oil is present on the image bearing member, the adhesion of the toner images to the image bearing member decreases, and therefore image omissions do not occur even when the toner images are pressed at a large pressure toward the image bearing member.

When the free silicone degree is too large, the toner particles tend to aggregate, resulting in deterioration of resolution and/or decrease of image density because each of the toner particles cannot move alone. Therefore the content of the free silicone oil should be fallen in the proper range (i.e., the free silicone degree is from 10 to 70%).

In the present invention, the free silicone degree is defined as follows:

$$\text{Free silicone degree } (\%) = (Wfs/Ws) \times 100$$

wherein Wfs represents the weight of the free silicone oil and Ws represents the total weight of the silicone oil present on the particulate inorganic material.

Therefore, even if the weight of free silicone oil is the same, the free silicone degree changes depending on the surface area and particle diameter of the additive.

When the free silicone degree is too small, the effect (i.e., to prevent image omissions) can hardly be exerted. To the contrary, when the free silicone degree is too large, adverse effects such as deterioration of resolution and image density of the resultant images are exerted. The free silicone degree correlates with such an effect higher than the weight of the free silicone oil.

In the present invention, plural particulate inorganic materials may be added to the toner as the external additive.

As a result of the present inventors' investigation, it is found that by combining the toner of the present invention with a non-contact heat fixing method, images having good dot reproducibility can be produced.

Since toner images, which are not yet fixed, do not contact a fixing member such as a fixing roller and a fixing belt in a non-contact fixing method, the resolution of finely reproduced dot toner images can be maintained in the fixing process. However, the non-fixing method has a drawback such that the resultant toner image has a low gloss because the toner image does not contact a fixing member such as a fixing roller.

However, when the toner of the present invention is used, the resultant toner image has a high gloss even when fixed by a non-contact fixing method. The reason is considered to be that since the addition amount of the external additive can be reduced in the toner of the present invention, the resin included in the toner particles tends to be present on the surface area thereof and therefore the toner particles tend to fuse and mix with each other when heated. Therefore the resultant fixed toner image has a good combination of good image qualities (e.g., less omissions and high gloss) and good fixing qualities (e.g., good fixability).

In order to control the gloss of the fixed toner image, it is preferable that the fixed toner image is treated with a heat roller (i.e., to heat with a heat roller the fixed toner particles which have been fused and mixed with each other).

If desired, the surface of the heat roller may be coated with a releasing agent such as silicone oils and liquid waxes.

This heat treatment is different from the fixing methods using a heat roller because the toner image is heated by the heat roller after the toner image is fixed. Therefore, the toner image is not excessively heated and pressed, the deterioration of dot reproducibility of the resultant toner image can be minimized.

When the conventional toners mentioned above is used for image forming apparatus having normal copying (or printing) speed, good images can be produced. However, when such toners are used for high speed image forming apparatus, the following problems occur:

(1) When the copying speed is increased (i.e., the rotating speed of an image bearing member is increased), the pressure applied to a toner image on the image bearing member is also increased, resulting in deterioration of image transfer from the image bearing member to a receiving material (i.e., generation of image omissions); and (2) When the copying speed is increased, the fixing time is decreased (i.e., the quantity of heat applied to a toner image is decreased), resulting in deterioration of fixing property of the resultant toner image. If an external additive is added to the toner in a large amount to improve the problem mentioned in item (1), the fixing properties are further deteriorated.

In addition, when a long image bearing member is used for producing a large size image or an image bearing member having a large surface area is used for prolonging the life thereof, the same problems as mentioned in item (1) occur. This is because the weight of the image bearing member increases. Namely, when such an image bearing member having a heavy weight is driven by a receiving material, the pressure applied to the image bearing member has to be increased, resulting in occurrence of the problem mentioned in item (1).

When the toner of the present invention including a particulate inorganic material which is treated with a silicone oil and which has an average particle diameter not greater than 100 nm is used, images having a combination of good image qualities and good fixing properties can be produced even when the image bearing member is rotated at a high speed or a heavy weight image bearing member is used. The reason is considered to be that silicone oils have low surface energy and therefore the adhesion of the toner to the image bearing member can be controlled so as to be low even when the pressure applied by the receiving material is increased. Thus, the addition amount of the additive can be controlled such that the resultant images have a good combination of good image qualities and good fixing property.

The toner of the present invention preferably has a shape similar to a spherical shape. The shape of the toner has a large influence on the charge quantity and thin film formability of the toner when the toner is mixed with a carrier and agitated by a supplying roller and when the toner on a developing roller is regulated by a toner regulator. When the toner has an irregular shape, the resultant toner layer tends to become too thin and have insufficient charge quantity.

When the toner has a spherical shape, the resultant toner tends to pass through a toner regulating member and a toner supplying roller, and thereby the amount of the toner supplied to the developing position excessively increases. Therefore, various problems such that image density and gloss of images tends to excessively increase, resolution of images deteriorates, background fouling occurs and toner consumption increases.

Therefore, the toner of the present invention preferably has a spherical degree not less than 0.93, preferably not less than 0.94, and more preferably from 0.95 to 0.99 to produce images having good fineness and good image density reproducibility.

In the present invention, the spherical degree of particles is determined as follows:
(1) a suspension including particles to be measured is passed through a detection area formed on a plate in an measuring instrument; and
(2) the particles are optically detected by a CCD camera and then the shapes thereof are analyzed.

The spherical degree of a particle is determined by the following equation:

$$\text{Spherical degree} = C_s/C_p$$

wherein Cp represents the circumference of the projected image of a particle and Cs represents the circumference of a circle whose area is the same as that of the projected image of the particle.

The spherical degree of toner particles can be determined as an average spherical degree by a flow-type particle image analyzer, FPIA-1000 manufactured by Toa Medical Electronics Co., Ltd.

Specifically, the method of determining the spherical degree of toner particles are as follows:
(1) 0.1 to 0.5 g of a sample to be measured is mixed with 100 to 150 ml of water from which solid impurities have been removed and which includes 0.1 to 0.5 ml of a dispersant (i.e., a surfactant) such as an alkylbenzene sulfonic acid salt;
(2) the mixture is dispersed using an ultrasonic dispersing machine for about 1 to 3 minutes to prepare a suspension including particles of 3000 to 10000 per 1 micro-liter of the suspension; and
(3) the average spherical degree of the sample in the suspension is determined by the measuring instrument mentioned above.

In the present invention, the surface of a particulate inorganic material, which is added to the toner of the present invention as an external additive, is preferably hydrophobized. Suitable hydrophobizing methods include a method in which an inorganic powder is treated with an organic silicon compound which can react with the inorganic powder or which the inorganic powder physically adsorb. In the present invention, a hydrophobized inorganic material is preferably prepared by forming an inorganic powder by oxidizing a halogenated metal in a vapor phase and then treating the inorganic powder with an organic silicon compound.

Specific examples of such silicon compounds include hexamethylene disilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, ρ-chloroethyltrichlorosilane, chloromethyldimethylchlorosilane, triorganosilylmercaptane, trimethylsilylmercaptane, triorganosilyl acrylate, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, dimethylpolysiloxane having 2 to 12 siloxane units in a molecule and a hydroxy group at its end position connecting with silicon atom, and the like compounds.

In addition, silica which is treated with a silane coupling agent having a nitrogen atom can also be used as the external additive.

Specific examples of such silane coupling agents include aminopropyltrimethoxysilane, aminopropyltriethoxysilane, dimethylaminopropyltrimethoxysilane, diethylaminopropyltrimethoxysilane, dipropylaminopropyltrimethoxysilane, dibutylaminopropyltrimethoxysilane, monobutylaminopropyltrimethoxysilane, dioxtylaminopropyltrimethoxysilane, dibutylaminopropyldimethoxysilane, dibutylaminopropylmonomethoxysilane, dimethylaminophenyltriethoxysilane, trimethoxysilyl-γ-propylphenylamine, trimethoxysilyl-γ-propylbenzylamine, trimethoxysilyl-γ-propylpiperidine, trimethoxysilyl-γ-propylmorphorine, trimethoxysilyl-γ-propylimidazole, and the like compounds.

These compounds are used alone or in combination.

The hydrophobized particulate inorganic material preferably has a hydrophobic degree of from 30 to 100. In the present invention, the hydrophobic degree is determined by a titration method using methanol.

The titration method using methanol is as follows:
(1) 0.2 g of a sample is added in water of 50 ml in a flask;
(2) methanol is added to the mixture drop by drop while the mixture is agitated by a magnetic stirrer; and
(3) methanol is added until all the sample is wet by the mixture of water and methanol.

The hydrophobic degree is defined as follows:

$$\text{Hydrophobic degree} = (Wm/Ww+m) \times 100 \, (\%)$$

wherein Wm represents an addition quantity of methanol by weight, and Wm+w represents a total weight of methanol and water.

Specific examples of the silicone oils useful for treating an inorganic material in the present invention include dimethylsilicone oils, methylphenylsilicone oils, chlorophenylsilicone oil, methylhydrogensilicone oil, alkyl-modified silicone oils, fluorine-modified silicone oils, polyether-modified silicone oils, alcohol-modified silicone oils, amino-modified silicone oils, epoxy-modified silicone oils, epoxy/polyether-modified silicone oils, phenol-modified silicone oils, carboxyl-modified silicone oils, mercapto-modified silicone oils, acrylic-modified silicone oils, methacrylic-modified silicone oils, α-methylstyrene-modified silicone oils, and the like silicone oils. These silicone oils can be used alone or in combination.

In the present invention, the silicone oil preferably has a free silicone degree of from 10 to 70%, and more preferably from 30 to 50% to avoid occurrence of image omissions. In addition, the hydrophobic degree of the inorganic material treated by a silicone oil is preferably from 30 to 100.

Specific examples of the particulate inorganic material for use in the external additive include silica, alumina, titanium oxide, barium titanate, magnesium titanate, calcium titanate, strontium titanate, iron oxide, copper oxide, zinc oxide, tin oxide, silica sand, clay, mica, wollastonite, diatom earth, chromium oxide, cerium oxide, colcothar, antimony trioxide, magnesium oxide, zirconium oxide, barium sulfate, barium carbonate, silicon carbide, silicon nitride and the like inorganic materials. Among these materials, silica and titanium oxide are preferable. The content of the inorganic material in the toner is from 0.1 to 5% by weight, and preferably from 0.3 to 3% by weight.

Specific examples of the suitable particulate inorganic material include MOX80 having an average particle diameter of about 30 nm, OX50 having an average particle diameter of about 40 nm, and TT600 having an average particle diameter of about 40 nm, all of which are manufactured by Nippon Aerosil Co.; IT-PB having an average particle diameter of about 40 nm, and IT-PC having an average particle diameter of about 60 nm, both of which are manufactured by Idemitsu Kosan Co., Ltd.; and TAF110A having an average particle diameter of from about 40 nm to 50 nm, and TAF510 having an average particle diameter of from about 40 nm to 50 nm, both of which are manufactured by Fuji Titanium Industry Co., Ltd. These inorganic materials can be used alone or in combination.

The average primary particle diameter of a particulate inorganic material, which has been treated with a silicone oil, for use as the external additive is preferably not greater than 100 nm, and more preferably not greater than 70 nm. When the average particle diameter is too large, the surface area of the inorganic material decreases, and thereby the amount of the silicone oil which the inorganic material can bear decreases. Therefore, the effect of the silicone oil tends to be hardly exerted. In the present invention, the average particle diameter of the particulate inorganic material means the number average primary particle diameter.

In the present invention, the average particle diameter of an inorganic material can be measured by a particle diameter distribution measuring instrument, which measures particle diameter utilizing dynamic light scattering. Specific examples thereof include DLS-700 manufactured by Otsuka Electronics Co., Ltd. and Coulter N4 manufactured by Coulter Electronics, Inc. However, since it is impossible to dissociate the aggregated inorganic material, it is preferable to directly determine the particle diameter using a scanning electron microscope or a transmission electron microscope. It is more preferable to directly observe the external additive on the surface of a toner particle using a field emission type scanning electron microscope (FE-SEM) at a magnification of 100,000. In this case, it is preferable that at least 100 particles of an inorganic material are observed to obtain the average of the major particle diameter thereof (i.e., the diameter in the major axis direction). When the external additive has an aggregated state on the surface of a toner, the major particle diameter of the primary particles constituting the aggregated external additive is measured to determine the average particle diameter.

The method for treating a particulate inorganic material with a silicone oil is, for example, as follows:

(1) a particulate inorganic material is heated in an oven which is heated at several hundred degree C to fully remove water therefrom; and
(2) the inorganic material is uniformly contacted with a silicone oil such that the silicone oil adheres on the surface of the inorganic material.

In order to uniformly contact an inorganic material with a silicone oil, for example, the following methods can be used:

(1) an inorganic material is directly mixed with a silicone oil using a mixer having a rotating blade or the like mixer; and
(2) an inorganic material is dipped into a mixture of a silicone oil and an organic solvent having relatively low boiling point, and then the organic solvent is dried to remove the organic solvent therefrom.

When the silicone oil to be coated has a high viscosity, it is preferable to use the latter method.

The inorganic powder on which the silicone oil adheres is then heated in an oven heated at a temperature from 100° C. to several hundred degree C. By this heat treatment, the metal in the inorganic material can be combined with the silicone oil by forming a siloxane bonding using hydroxyl group on the surface of the inorganic material, and/or the silicone oil itself can be polymerized and crosslinked. In this case, a catalyst such as acids, alkalis, metal salts such as zinc octylate, tin octylate and dibutyl tin dilaurate may be added to the silicone oil to accelerate the reaction.

In addition, the particulate inorganic material may be treated with a hydrophobizing agent such as silane coupling agent before the silicone oil treatment. When an inorganic material is preliminarily hydrophobized, the amount of the silicone oil which the surface of the material adsorbs increases.

The free silicone degree in the external additive largely depends on this heat treatment. At this point, the silicone oil which is not a free silicone oil needs not necessarily combine chemically with the surface of the inorganic material, and the silicone oil which is adsorbed by the fine holes on the surface of the inorganic material physically is also considered as the unfree silicone oil. The free silicone oil is defined as the silicone oil which is easily released from the inorganic material when the inorganic material contacts other materials such as the other particles of the inorganic material and the mixer used.

In the present invention, the free silicone degree is determined as follows:

(1) Extraction of Free Silicone Oil

A sample to be measured is added in chloroform, and the mixture is agitated and then allowed to settle. The mixture is centrifuged and then the supernatant is removed to obtain the precipitate. Then chloroform is added to the thus prepared precipitate, and the mixture is agitated and then allowed to settle. This procedure is repeated to remove the free silicone oil.

(2) Determination of Carbon Amount

The carbon amount of the sample is determined using a CHN element analyzing instrument (CHN Corder MT-5, manufactured by Yanako Co., Ltd.)

(3) Determination of Free Silicone Degree

The free silicone degree is determined by the following equation:

$$\text{Free silicone degree}=(C_0-C_1)/C_0\times 100(\%)$$

wherein $C_0$ represents the carbon amount of the sample before the extraction treatment, and $C_1$ represents the carbon amount of the sample after the extraction treatment.

In the present invention, another particulate inorganic material (hereinafter referred to as a second particulate inorganic material), which is not subjected to the surface treatment mentioned above or which is treated with a hydrophobizing agent other than silicone oils, may be included in the toner together with the external additive of the present invention. Specific examples of the hydrophobizing agent include silane coupling agents, silylation agents, silane coupling agents having a fluorinated alkyl group, organic titanate coupling agents, aluminum coupling agents and the like compounds.

The second particulate inorganic material preferably has an average particle diameter less than that of the particulate inorganic material used as the external additive. By adding this second particulate inorganic material, the coverage of the surface of the toner is increased, and thereby good fluidity is imparted to the toner. Therefore, the resultant toner images have good image reproducibility, and good image density. In addition, aggregation and solidification of toner particles can be avoided. The content of the second particulate inorganic material in the toner is preferably from 0.01 to 5% by weight, and preferably 0.1 to 2% by weight.

In addition, the toner of the present invention preferably includes a particulate resin, which serves as another external additive, together with the external additive of the present invention to uniformly charge the toner particles. Therefore, background fouling can be prevented. The average particle diameter of the particulate resin is preferably greater than that of the particulate inorganic material in the external additive of the present invention. The addition quantity of the particulate resin is 0.01 to 5% by weight, and preferably from 0.1 to 2% by weight, of the toner. Next, the constituents of the toner of the present invention other than the external additive will be explained in detail. Specific examples of the binder resin for use in the toner of the present invention include styrene polymers and substituted styrene polymers such as polystyrene, poly-p-chlorostyrene, polyvinyltoluene and the like; styrene copolymers such as styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, styrene-maleic acid ester copolymers and the like; and other resins such as polymethyl methacrylate, polybutyl methacrylate, polyvinyl chloride, polyvinyl acetate, polyethylene, polypropylene, polyesters, epoxy resins, epoxy polyol resins, polyurethane resins, polyamide resins, polyvinyl butyral resins, acrylic resins, rosin, modified rosins, terpene resins, aliphatic or alicyclic hydrocarbon resins, aromatic petroleum resins, chlorinated paraffin, paraffin waxes, and the like. These resins are used alone or in combination.

Suitable colorants include known dyes and pigments. Specific examples of the colorants include carbon black, Nigrosine dyes, black iron oxide, Naphthol Yellow S, Hansa Yellow (10G, 5G and G), Cadmium Yellow, yellow iron oxide, loess, chrome yellow, Titan Yellow, polyazo yellow, Oil Yellow, Hansa Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and the like. These materials are used alone or in combination. The content of the colorant in the toner is preferably from 0.1 to 50 parts by weight per 100 parts by weight of the binder resin included in the toner.

The particles of the toner of the present invention may include a magnetic material to be used as a magnetic toner. Specific examples of such magnetic materials for use in the toner include iron oxides such as magnetite, hematite and ferrite; metals such as iron, cobalt and nickel; and metal alloys or mixtures of such a metal with a metal such as aluminum, copper, lead, magnesium, tin, zinc, antimony, beryllium, bismuth, cadmium, calcium, manganese, selenium, titanium, tungsten and vanadium.

The toner of the present invention may include a charge controlling agent. As the charge controlling agent, known charge controlling agents can be used. Specific examples of the charge controlling agent include Nigrosine dyes, triphenylmethane dyes, chromium-containing metal complex dyes, chelate pigments of molybdic acid, Rhodamine dyes, alkoxy amines, quaternary ammonium salts (including quaternary ammonium salts modified by fluorine), alkylamides, phosphorous, phosphorous compounds, tungsten, tungsten compounds, fluorine-containing surfactants, salicylic acid metal salts, metal salts of salicylic acid derivatives, and the like compounds. These compounds can be used alone or in combination.

Specific examples of such charge controlling agents include Bontron 03 (Nigrosine dyes), BONTRON P-51 (quaternary ammonium salt), BONTRON S-34 (metal-containing azo dye), E-82 (metal complex of oxynaphthoic acid), E-84 (metal complex of salicylic acid), and E-89 (phenolic condensation product), which are manufactured by Orient Chemical Industries Co., Ltd.; TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and NX VP434 (quaternary ammonium salt), which are manufactured by Hoechst AG; LRA-901, and LR-147 (boron complex), which are manufactured by Japan Carlit Co., Ltd.; copper phthalocyanine, perylene, quinacridone, azo pigments and polymers having a functional group such as a sulfonate group, a carboxyl group, a quaternary ammonium group and the like; and the like.

The content of the charge controlling agent in the toner of the present invention depends on the species of the binder resin used, whether other additives are present, and the method for manufacturing the toner. In general, the content is from 0.1 to 10 parts by weight, and preferably from 2 to 5 parts by weight, per 100 parts by weight of the binder resin included in the toner. When the content of the charge controlling agent is too low, the resultant toner has insufficient charge and therefore the toner cannot be practically used. To the contrary, when the content is too high, the resultant toner has a high charge and therefore the electrostatic attraction between the toner and a carrier increases, resulting in deterioration of fluidity of the developer and decrease of the image density of the resultant images.

The toner preferably includes a wax to improve the releasability thereof. Suitable waxes for use in the toner include waxes having a melting point of from 40 to 120° C. and preferably from 50 to 110° C. When the melting point of the wax included in the toner is too high, the low temperature fixability of the resultant toner deteriorates. To the contrary, when the melting point is too low, the offset resistance and durability of the resultant toner deteriorates.

The melting point of waxes can be determined by a method using a differential scanning calorimeter (i.e., DSC). Namely, a few milligrams of a sample is heated at a constant heating speed, for example, 10° C./min to determine the temperature at which the sample melts, i.e., a melting peak of the sample is observed.

Specific examples of the waxes include solid paraffin waxes, microcrystalline waxes, rice waxes, fatty acid amide waxes, fatty acid waxes, aliphatic monoketones, fatty acid metal salt waxes, fatty acid ester waxes, partially-saponified fatty acid ester waxes, silicone varnishes, higher alcohols, carnauba waxes, polyolefins such as low molecular weight polyethylene and polypropylene, and the like waxes. In particular, polyolefins having a softening point of from 70 to 150° C., and preferably from 120 to 150° C., which is determined by a ring and ball method, are preferable.

The toner may include a cleanability improving agent which can improve the cleaning property of the toner remaining on the surface of an image bearing member such as a photoreceptor after a toner image is transferred. Specific examples of such a cleanability improving agent include fatty acids and their metal salts such as stearic acid, zinc stearate, and calcium stearate; and particulate resins.

Specific examples of such particulate resins include particulate polymers such as polymers and copolymers of polystyrene, polymethacrylates and polyacrylates, and polycondensation polymers and thermosetting resins of silicone resins, benzoguanamine resins and nylon resins, which are typically prepared by a soap-free polymerizaion method, a suspension polymerization method, a dispersion polymerization method or the like method. Particulate resins having a relatively narrow particle diameter distribution and a volume average particle diameter of from 0.01 to 1 $\mu$m are preferably used in the toner of the present invention.

The content of the cleanability improving agent in the toner is from 0.01 to 5% by weight, and preferably from 0.1 to 2% by weight.

Then the method of preparing the toner of the present invention will be explained.

The toner of the present invention is typically prepared by the following method:
(1) toner constituents including at least a binder resin, a main charge controlling agent and a pigment are mechanically mixed (mixing process);
(2) the toner constituents are kneaded while heated (kneading process);
(3) the kneaded mixture is cooled and then pulverized to form a color powder (pulverizing process); and
(4) the color powder is classified to prepare a mother toner (classifying process).

The color powder having an undesired particle diameter (hereinafter referred to as a by-product) may be reused for the mixing and kneading processes. When the by-product is re-used, the mixing ratio of the by-product to the new raw materials is preferably 1/99 to 50/50 by weight.

The mixing process is not particularly limited, and the toner constituents are merely mixed mechanically using a known mixer having a rotating blade.

In the kneading process, the mixture is contained in a kneader and then kneaded. Suitable kneaders include the kneaders include single-axis or double-axis continuous kneaders and batch kneaders such as roll mills. Specific examples of the kneaders include KTK double-axis extruders manufactured by Kobe Steel, Ltd., TEM extruders manufactured by Toshiba Machine Co., Ltd., double-axis extruders manufactured by KCK Co., Ltd., PCM double-axis extruders manufactured by Ikegai Corp., and KO-KNEADER manufactured by Buss AG.

In the kneading process, it is important to control the kneading conditions so as not to cut the molecular chains of the binder resin used in the toner. Specifically, when the mixture is kneaded at a temperature much lower than the softening point of the binder resin used, the molecular chains of the binder resin tend to be cut. When the kneading temperature is too high, the pigment in the mixture cannot be fully dispersed.

In the pulverizing process, it is preferable that the kneaded mixture is at first crushed to prepare coarse particles (hereinafter referred to as a crushing step) and then the coarse particles are pulverized to prepare fine particles (hereinafter referred to as a pulverizing step). In the pulverizing step, a pulverizing method in which coarse particles are pulverized by being collided against a collision plate by jet air or a pulverizing method in which coarse particles are pulverized at a narrow gap between a mechanically-rotating rotor and a stator is preferably used.

After the pulverizing process or during the pulverizing step, the pulverized particles are classified by air flow and centrifugal force. Thus, mother toner particles having a desired spherical degree and average particle diameter can be prepared. The spherical degree of the mother toner particles is preferably not less than 0.93, and more preferably not less than 0.94. In addition, the weight average particle diameter of the toner is preferably from 4 to 20 $\mu$m, and more preferably from 6 to 10 $\mu$m.

The weight average particle diameter of a toner can be measured by various methods. In the present invention, the weight average particle diameter is measured using a Multicizer II manufactured by Coulter Electronics, Inc., together with an interface, which is manufactured by Nikkaki-Bios. Co., Ltd. and by which numerical and volumetric particle distribution can be output, and a personal computer. As the electrolyte, 1% sodium chloride aqueous solution prepared using highest quality sodium chloride or first-class sodium chloride is used.

The method for measuring the weight average particle diameter is as follows:
(1) a surfactant (preferably, 0.1 to 5 ml of an alkylbenzenesulfonic acid salt) serving as a dispersant is added to 100 to 150 ml of the electrolyte, and then a sample to be measured is added thereto;
(2) the sample is ultrasonically dispersed for about 1 to 3 minutes to prepare a suspension;
(3) the suspension is contained in Multicizer II to measure the volumetric particle diameter distribution and the numerical particle diameter distribution.

An aperture of 100 $\mu$m is used in Multicizer II when the particle diameter of a toner is measured. The weight average particle diameter of a toner can be determined using the volumetric particle distribution.

Then the particulate inorganic material mentioned above (i.e., the external additive) is added to the thus prepared mother toner, and the mixture is mixed by a mixer.

Suitable mixers include known mixers typically used for mixing powders. It is preferable for the mixers to have a jacket to control the inside temperature thereof. In order to change the stress to the external additive, the rotation number and rolling speed of the mixers used, and mixing time and mixing temperature may be changed. In addition, the stress to the toner may be changed with elapse of time. For example, a method in which at first a high stress is applied to the toner and then a low stress is applied, or a method in which at first a low stress is applied and then a high stress is applied thereto may be used.

Specific examples of the suitable mixers include V-form mixers, locking mixers, Loedge Mixers, Nauter Mixers, Henshel Mixers and the like mixers.

In the present invention, the above-mentioned particulate inorganic material may be included in the toner particles as an internal additive. When a particulate inorganic material is used as an internal additive, the inorganic material is included in the mixture in the mixing process or the kneading process.

In addition, the toner of the present invention may include one or more particulate inorganic material as an internal additive and an external additive. In addition, other additives for improving, for example, the fluidity, preservability, developing properties and transferability of the resultant toner can be added to the toner.

The toner of the present invention can be used as a one-component magnetic or non-magnetic developer and for a two-component developer in which the toner is mixed with a magnetic carrier. The weight ratio of the toner to the carrier is preferably from 1/100 to 10/100.

Suitable carriers for use in the two component developer include known carrier materials such as iron powders, ferrite powders, magnetite powders, magnetic resin carriers, which have a particle diameter of from 20 to 200 $\mu$m. The surface of the carriers may be coated by a resin.

Specific examples of such resins include amino resins such as urea-formaldehyde resins, melamine resins, benzoguanamine resins, urea resins, and polyamide resins, and epoxy resins. In addition, vinyl or vinylidene resins such as acrylic resins, polymethylmethacrylate resins, polyacrylonitirile resins, polyvinyl acetate resins, polyvinyl alcohol resins, polyvinyl butyral resins, polystyrene resins, styrene-acrylic copolymers, halogenated olefin resins such as polyvinyl chloride resins, polyester resins such as polyethyleneterephthalate resins and polybutyleneterephthalate resins, polycarbonate resins, polyethylene resins, polyvinyl fluoride resins, polyvinylidene fluoride resins, polytrifluoroethylene resins, polyhexafluoropropylene resins, vinylidenefluoride-acrylate copolymers, vinylidenefluoride-vinylfluoride copolymers, copolymers of tetrafluoroethylene, vinylidenefluoride and other monomers including no fluorine atom, and silicone resins.

If desired, an electroconductive powder may be included in the toner. Specific examples of such electroconductive powders include metal powders, carbon blacks, titanium oxide, tin oxide, and zinc oxide. The average particle diameter of such electroconductive powders is preferably not greater than 1 $\mu$m. When the particle diameter is too large, it is hard to control the resistance of the resultant toner.

The toner of the present invention can also be used as a one-component magnetic developer or a one-component non-magnetic developer.

The toner of the present invention and a two-component developer including the toner of the present invention is typically contained in a container such as bottles and cartridges. Such containers including the developer are typically sold by themselves to be set in image forming apparatus by users.

In the present invention, a typical driving method for driving the image bearing member is shown in FIG. 1. In FIG. 1, numerals 1, 2 (i.e., 2a and 2b) and 3 (i.e., 3a and 3b) denote a receiving material, image bearing members and transfer members. The image bearing members 2a and 2b are rotated by the receiving material 1 which is fed in the direction indicated by an arrow. Toner images on the image bearing members 2a and 2b are transferred on the receiving material 1 at the nips of the receiving material 1 and the image bearing members 2a and 2b while the receiving material is charged by the transfer members 3a and 3b. The transfer members 3a and 3b are a charger, however the transfer members may be a transfer roller. The toner images on the image bearing members 2a and 2b can be formed by, for example, developing electrostatic latent images with a developer layer formed on a developing roller by a regulating blade.

Figure 2:
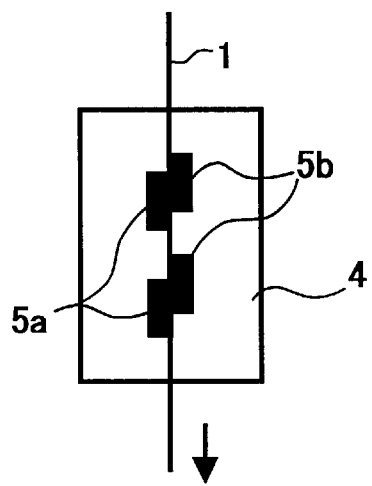
FIG. 2 is a schematic diagram illustrating an embodiment of the non-contact heat fixing method for use in the image forming method of the present invention.

The toner images transferred on the receiving material 1 are then fixed by a fixing device. Any known fixing devices can be used for fixing images of the toner of the present invention. However, it is preferable to use non-contact heat fixing methods for fixing double-sided copies. It is more preferable to use oven fixing methods in which heated air is sprayed to the toner images because of producing images having good dot reproducibility (i.e., images having good resolution). FIG. 2 is a schematic view illustrating an embodiment of the non-contact heat fixing device for use in the present invention. As shown in FIG. 2, toner images 5a and 5b on the receiving material 1 are fixed in an oven 4.

In addition, the toner of the present invention can be used for a full color image forming method using non-magnetic one component developer and an electroconductive brush. Specifically, by repeating an image forming operation using color toners in which a color image (such as yellow, magenta, cyan and black images) formed on an image bearing member is transferred on a receiving material, a full color image is formed on the receiving material. In this case, at least one of the color toners is the toner of the present invention. The resultant full color image has good halftone reproducibility.

In this full color image forming method, a developing device having plural developing sections for forming plural color toner images. Each of the developing sections has a developing roller configured to bear a developer layer thereon and a regulating blade configured to control the thickness of the developer layer. Electrostatic latent images, which correspond the respective color images and which are formed on the image bearing member one by one, are developed by the developing sections, resulting in formation of color toner images on the image bearing member one by one. The color toner image is then transferred on a receiving material one by one to form a full color image. The electrostatic latent images can be formed by, for example, charging a photoreceptor (i.e., image bearing member) with a charger using an electroconductive brush and then irradiating the photoreceptor with imagewise light.

The color toners may be transferred on an intermediate transfer medium to form a full color image thereon. The full color image is then transferred on a receiving material.

Figure 3:
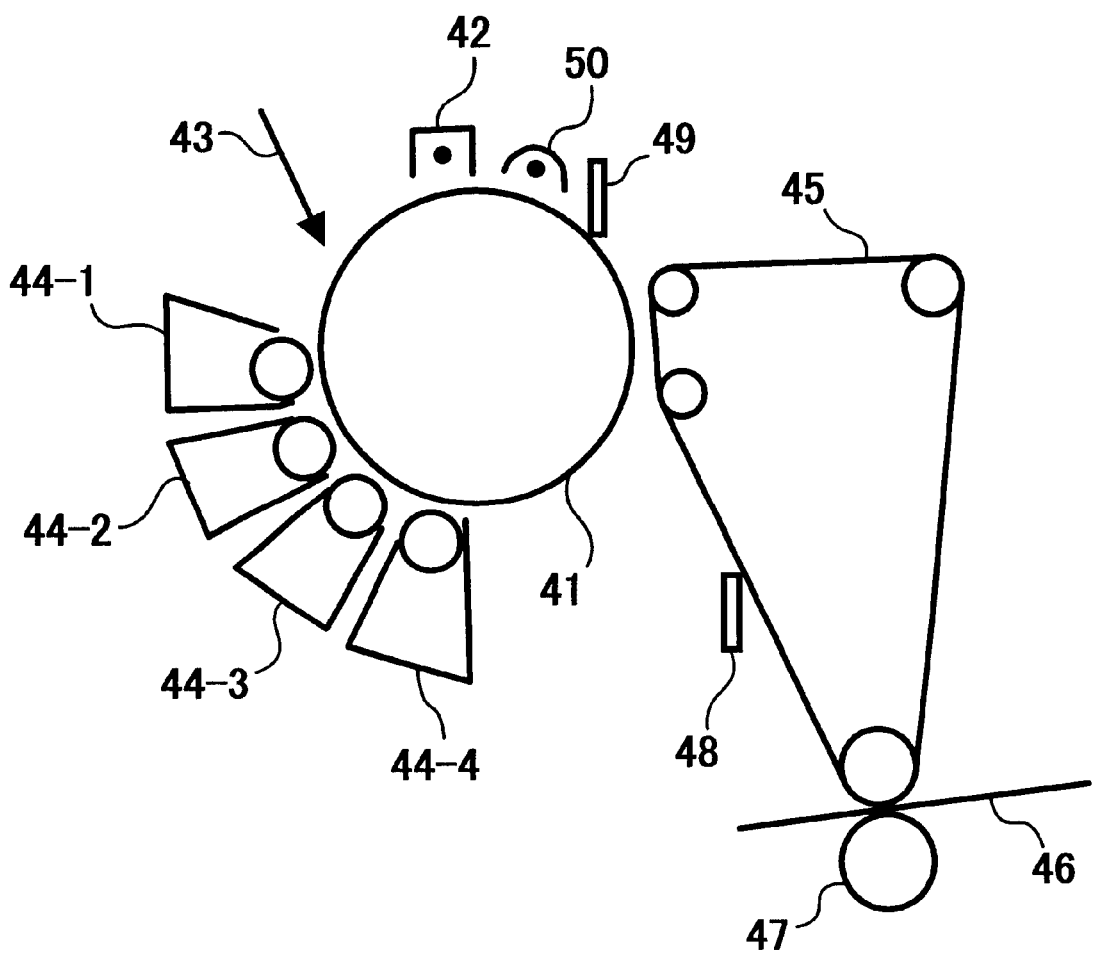
FIG. 3 is a schematic view illustrating an image forming apparatus for use in the image forming method of the present invention.

FIG. 3 is a schematic view illustrating an image forming apparatus for use in the image forming method of the present invention. A photoreceptor 41 is charge by a charger 42 such that the surface of the photoreceptor 41 is entirely charged.

The photoreceptor 41 is then exposed to imagewise light 43 to form an electrostatic latent image thereon. The electrostatic latent image is then developed by one of developing sections 44-1 to form a color toner image on the photoreceptor 41. The color toner image is then transferred on an intermediate transfer medium 45 while the intermediate transfer medium is contacted with the color toner image and rotated. The surface of the photoreceptor 41 is cleaned by a cleaner 49 to remove toner particles remaining on the surface of the photoreceptor 41. Then a discharging lamp 50 irradiates the photoreceptor 41 with light to remove the charge remaining on the photoreceptor 41.

The another color toner image is formed on the photoreceptor 41 by repeating the above-mentioned procedure except that a developing section 44-2 including a different color developer is used. The thus prepared color toner image is then transferred on the previously formed color image on the intermediate transfer medium 45. Similarly, other color toner images formed using developing sections 44-3 and 44-4 are formed on the photoreceptor 41 one by one. The color toner images are also transferred on the color images on the intermediate transfer medium 45. Thus a color image (for example, a full color image) is formed on the intermediate transfer medium 45.

The color image formed on the intermediate transfer medium 45 is then transferred on a receiving material 46 at once by a transfer roller 47. The intermediate transfer medium 45 is cleaned by a cleaner 48.

In the full color image forming method, plural image bearing members may be used to form the respective color toner image thereon. The plural color toner images are transferred on an intermediate transfer medium or a receiving material.

In the developing process, a reverse developing method is preferably used in which an electrostatic latent image is developed with a developer having a charge whose polarity is the same as that of the electrostatic latent image.

In addition, it is preferable that an electrostatic latent image on a photoreceptor is developed with a developer on the developing roller while the developer directly contacts the photoreceptor and the developing roller is rotated at a speed higher than that of the photoreceptor.

When the toner of the present invention is used for image forming apparatus having a corotron transfer device, the transferability of toner images can be improved. However, the effect of the toner can be fully exerted when the toner is used for image forming apparatus in which toner images are transferred from an image bearing member to a receiving material while transfer means such as a transfer roller presses the receiving material toward the image bearing member.

In addition, when the toner is used for image forming apparatus having a paper-drive image transferring method as shown in FIG. 1, the effect of the present toner can be fully exerted.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation of External Additives A

The external additive was prepared by the following method, but the method of preparing the external additive of the present invention is not limited thereto.

The following components were contained in a flask of 300 ml and mixed at room temperature for 30 minutes using a magnetic stirrer to prepare a silicone solution.

| | |
|---|---|
| Polydimethyl siloxane (tradenamed as KF-96 and manufactured by Shin-Etsu Chemical Co., Ltd., viscosity of 300 cs) | 2.73 |
| Toluene | 100 |

Thirty (30) parts of a silica OX-50 manufactured by Nippon Aerosil Co. and having an average primary particle diameter of 40 nm was gradually added into the silicone oil solution such that the silica was completely added therein by 1 hour, while agitating the mixture. Thus a dispersion in which the silica was perfectly wet by the silicone solution.

Then the dispersion was contained to a flask of 500 ml having an eggplant shape, and a probe of a dispersing machine UH-2C (manufactured by Choonpa Kogyo K.K.) emitting supersonic waves was dipped into the dispersion to ultrasonically disperse the dispersion for 1 hour while the flask was cooled by water.

After there was no aggregated particles of the silica in the dispersion, the dispersion was decompressed to 10 mmHg by a rotary evaporator (manufactured by Tokyo Rika Instrument) for 5 hours to remove toluene therefrom. The flask was heated at 40° C. using a water bath. The thus prepared solid was then dried at 50° C. under a pressure of 1 mmHg using a decompression oven (manufactured by Yamato Kagaku) such that the weight of the residue did not change. Thus a silicone-coated silica was prepared. The thus prepared silicone-coated powder was not subjected to a heat treatment. Then the powder was dissociated using a jet mill and then collected by a bag filter.

Thus an eternal additive A was prepared. The free silicone degree of the silicone oil was 78%.

Preparation of External Additive B

The procedure for preparation of the external additive A was repeated except that the addition quantity of the silicone oil was changed from 2.73 to 0.9 parts.

Thus an eternal additive B was prepared. The free silicone degree was 42%.

Preparation of External Additive C

The procedure for preparation of the external additive A was repeated except that the silicone-coated powder was subjected to a heat treatment. The heat treatment was performed for 2 hours using an electric furnace, OPE-RUSHER manufactured by ADVANTEC, which was filled with nitrogen gas (i.e., the oxygen concentration was not grater than 0.1%) and which was heated at 100° C. Then the thus prepared external additive was quickly contained in a desiccator including a silica gel to cool the external additive. The external additive was dissociated an IDS type jet mill (Nippon Pneumatic Mfg. Co., Ltd.) while supplying air compressed by a pressure of 6 kg/cm². The external additive was collected by a bag filter.

Thus an eternal additive C was prepared. The free silicone degree was 65%.

Preparation of External Additive D

The procedure for preparation of the external additive C was repeated except that the temperature of the heat treatment was changed to 200° C.

Thus an eternal additive D was prepared. The free silicone degree was 36%.

Preparation of External Additive E

The procedure for preparation of the external additive C was repeated except that the temperature of the heat treatment was changed to 300° C.

Thus an eternal additive E was prepared. The free silicone degree was 14%.

Preparation of External Additive F

The procedure for preparation of the external additive C was repeated except that the temperature of the heat treatment was changed to 400° C.

Thus an eternal additive F was prepared. The free silicone degree was 7%

Preparation of External Additive G

The procedure for preparation of the external additive D was repeated except the silica was changed to titanium oxide, which is tradenamed as TAF110A and manufactured by Fuji Titanium Co., Ltd. and which has an average primary particle diameter of 50 nm.

Thus an eternal additive G was prepared. The free silicone degree was 41%.

Preparation of External Additive H

The procedure for preparation of the external additive D was repeated except the silica was changed to alumina, which is tradenamed as Al OXIDE-C and manufactured by Nippon Aerosil Co. and which has an average primary particle diameter of 13 nm.

Thus an eternal additive H was prepared. The free silicone degree was 46%.

Preparation of Black Mother Toner (1)

The following components were mixed and agitated in a flasher.

| | |
|---|---|
| Water | 1200 |
| Phthalocyanine Green aqueous cake | 200 |
| (solid content of 30%) | |
| Carbon black | 540 |
| (Tradenamed as MA60 and manufactured by Mitsubishi Chemical Corp.) | |

Then 1200 parts of a polyester resin having an acid value of 3, a hydroxyl value of 25, a number average molecular weight Mn of 45000, a ratio Mw/Mn of 4.0, and a glass transition temperature Tg of 60° C.) were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Thus a black pigment master batch was prepared.

The following components were mixed.

| | |
|---|---|
| Polyester resin | 100 |
| (acid value of 3 mgKOH/g, hydroxyl value of 25 mgKOH/g, Mn of 45000, Mw/Mn of 4.0 and Tg of 60° C.) | |
| The black pigment master batch | 5 |
| Charge controlling agent | 4 |
| (tradenamed as Bontron E-84 and manufactured by Orient Chemical Industries Co., Ltd.) | |

The mixture was melted and kneaded by a two-roll mill. Then the mixture was cooled by rolling. The mixture was pulverized by a pulverizer (I TYPE MILL manufactured by Nippon Pneumatic Mfg. Co., Ltd.) which is a jet mill using a collision plate, and then the pulverized mixture was air-classified by a classifier (DS CLASSIFIER manufactured by Nippon Pneumatic Mfg. Co., Ltd.) which uses circling air.

Thus, a black mother toner having a weight average particle diameter of 13.5 μm was prepared.

Preparation of Yellow Mother Toner (1)

The following components were mixed and agitated in a flasher.

| | |
|---|---|
| Water | 600 |
| Pigment Yellow 17 aqueous cake | 1200 |
| (solid content of 50%) | |

Then 1200 parts of the polyester resin mentioned above were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a yellow pigment master batch was prepared.

The following components were mixed.

| | |
|---|---|
| The polyester resin mentioned above | 100 |
| The yellow pigment master batch prepared above | 5 |
| Charge controlling agent | 4 |
| (Bontron E-84) | |

The mixture was melted and kneaded by a two-roll mill. Then the mixture was cooled by rolling. The mixture was pulverized and air-classified in the same way as performed in the black toner preparation.

Thus, a yellow mother toner having a weight average particle diameter of 13.2 μm was prepared.

Preparation of Magenta Mother Toner (1)

The following components were mixed and agitated in a flasher.

| | |
|---|---|
| Water | 600 |
| Pigment Red 57 aqueous cake | 1200 |
| (solid content of 50%) | |

Then 1200 parts of the polyester resin mentioned above were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a magenta pigment master batch was prepared.

The following components were mixed.

| | |
|---|---|
| The polyester resin mentioned above | 100 |
| The magenta pigment master batch prepared above | 5 |
| Charge controlling agent | 4 |
| (Bontron E-84) | |

The mixture was melted and kneaded by a two-roll mill. Then the mixture was cooled by rolling. The mixture was pulverized and air-classified in the same way as performed in the black toner preparation.

Thus, a magenta mother toner having a weight average particle diameter of 13.5 μm was prepared.

Preparation of Cyan Mother Toner (1)

The following components were mixed and agitated in a flasher.

| | |
|---|---|
| Water | 600 |
| Pigment Blue 15:3 aqueous cake (solid content of 50%) | 1200 |

Then 1200 parts of the polyester resin mentioned above were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a cyan pigment master batch was prepared.

The following components were mixed.

| | |
|---|---|
| The polyester resin mentioned above | 100 |
| The cyan pigment master batch prepared above | 3 |
| Charge controlling agent (Bontron E-84) | 4 |

The mixture was melted and kneaded by a two-roll mill. Then the mixture was cooled by rolling. The mixture was pulverized and air-classified in the same way as performed in the black toner preparation.

Thus, a cyan mother toner having a weight average particle diameter of 13.4 μm was prepared.

Example 1

One hundred (100) parts of each of the above-prepared four mother toners were mixed with 1.0 part of the external additive B using a Henshel mixer. The mixture was sieved using a screen having openings of 50 μm to remove coarse particles.

Thus, four color toners of Example 1 were prepared.

Example 2

The procedure for preparation of the color toners in Example 1 was repeated except that the external additive was changed to the external additive C.

Thus, four color toners of Example 2 were prepared.

Example 3

The procedure for preparation of the color toners in Example 1 was repeated except that the external additive was changed to the external additive D.

Thus, four color toners of Example 3 were prepared.

Example 4

The procedure for preparation of the color toners in Example 1 was repeated except that the external additive was changed to the external additive E.

Thus, four color toners of Example 4 were prepared.

Example 5

The procedure for preparation of the color toners in Example 1 was repeated except that the external additive was changed to the external additive G.

Thus, four color toners of Example 5 were prepared.

Example 6

The procedure for preparation of the color toners in Example 1 was repeated except that the external additive was changed to the external additive H.

Thus, four color toners of Example 6 were prepared.

Example 7

The procedure for preparation of the color toners in Example 3 was repeated except that 0.5 parts of another external additive, a hydrophobized silica R972 having an average primary particle diameter of 16 nm and manufactured by Nippon Aerosil Co., were added thereto.

Thus, four color toners of Example 7 were prepared.

Example 8

The procedure for preparation of the color toners in Example 3 was repeated except that 0.5 parts of another external additive, a particulate acrylic resin MP-1000 having an average particle diameter of 400 nm and manufactured by Sohken Chemical Co., Ltd., were added thereto.

Thus, four color toners of Example 8 were prepared.

Example 9

The procedure for preparation of the color toners in Example 3 was repeated except that 0.5 parts of another external additive, a hydrophobized silica R972 having an average particle diameter of 16 nm and manufactured by Sohken Chemical Co., Ltd. and 0.5 parts of yet another external additive, a particulate acrylic resin MP-1000 having an average particle diameter of 400 nm and manufactured by Sohken Chemical Co., Ltd., were added thereto.

Thus, four color toners of Example 8 were prepared.

Comparative Example 1

The procedure for preparation of the color toners in Example 1 was repeated except that the external additive was changed to the external additive A.

Thus, four color toners of Comparative Example 1 were prepared.

Comparative Example 2

The procedure for preparation of the color toners in Example 1 was repeated except that the external additive was changed to the external additive F.

Thus, four color toners of Comparative Example 2 were prepared.

Evaluation Method A (1) Preparation of Developer

Each of the four color toner combinations of Examples 1 to 9 and Comparative Examples 1 and 2 was used as non-magnetic one component developers.

(2) Running Test

Each color developer combination was set in a full color laser printer IPSIO 5000 manufactured by Ricoh Co., Ltd., whose construction is shown in FIG. 3. In the printer, four color toner images were formed one by one on a belt-shaped photoreceptor using a developing device having four color developing sections. The developing method was a reverse developing method. The color toner images formed on the photoreceptor were transferred one by one to an intermediate transfer medium to form a full color image thereon. The full color image on the intermediate transfer medium was then transferred on a receiving material.

Ten thousand (10000) copies of an original image having an image area of 7% were produced. The evaluation items are as follows:

a) Image Density

The image densities of four color solid images formed on a receiving paper, TYPE 600 manufactured by Ricoh Co., Ltd., was measured by a densitometer X-Rite manufactured by X-Rite Corp.

b) Reproducibility of Fine Line Images

Black color line images having a density of 600 dpi, which consist of four color toners and were formed on the TYPE 600 paper, were visually observed to evaluate the reproducibility of the line images. The quality was classified into 5 grades of from grade 5 to grade 1. Grade 5 is the best.

c) Background Fouling

A white image was formed on the photoreceptor. After the white image was developed, the photoreceptor was stopped before the transfer process. The developers adhered on the photoreceptor were transferred on an adhesive tape. The optical densities of the adhesive tape having the developer thereon and the adhesive tape without developers thereon were measured by 938 SPECTRODENSITOMETER manufactured by X-Rite Corp., to obtain the difference between the optical densities. The greater the difference, the worse the background fouling. The background fouling was also classified into 5 grades.

d) Reproducibility of Half Tone Images

Black color half tone images consisting of four color toners, in which one dot image and one dot white image were alternately recorded repeatedly, were formed on a rough paper, X4024 paper manufactured by Xerox Corp. The half tone images were visually observed to classify the dot reproducibility into 5 grades.

e) Image Omissions

Black color character images consisting of four color toners were produced on an overhead projection sheet DX manufactured by Ricoh Co., Ltd. The images were visually observed to classify the image omissions into 5 grades.

The results are shown in Table 1.

| | Image density | Reproducibility of fine line image | Background fouling | Half tone reproducibility | Image omission |
|---|---|---|---|---|---|
| Ex. 1 | 1.76 | 4 | 4 | 5 | 5 |
| Ex. 2 | 1.91 | 5 | 5 | 5 | 5 |
| Ex. 3 | 2.03 | 4 | 5 | 4 | 5 |
| Ex. 4 | 1.79 | 3 | 3 | 3 | 3 |
| Ex. 5 | 1.94 | 5 | 4 | 5 | 5 |
| Ex. 6 | 1.71 | 3 | 4 | 4 | 3 |
| Ex. 7 | 1.90 | 4 | 5 | 5 | 5 |
| Ex. 8 | 1.88 | 5 | 5 | 4 | 5 |
| Ex. 9 | 1.92 | 5 | 5 | 5 | 5 |
| Comp. Ex. 1 | 1.06 | 2 | 3 | 2 | 2 |
| Comp. Ex. 2 | 1.23 | 1 | 1 | 1 | 1 |

Example 10

The color toners of Example 3 were evaluated as follows.

Evaluation Method B (1) Preparation of Developer

The four color toners of Example 3 were used as non-magnetic one component developers.

(2) Running Test

The four color developers were set in a tandem type full color LED printer GL8300 manufactured by Fujitsu Ltd. In the printer, four color toner images were formed on four drum-shaped photoreceptors, respectively, using a developing device having four color developing sections. The developing method was a reverse developing method. The color toner images were transferred one by one to an intermediate transfer medium to form a full color image thereon. The full color image was then transferred on a receiving material.

The evaluation items are the same as those of the evaluation method A. The results are shown in Table 2.

Example 11

The color toners of Example 3 were evaluated as follows.

Evaluation Method C (1) Preparation of Developer

Each of the four color toners of Example 3 was mixed with a carrier using a TURBULA mixer to prepare two component color developers. The formulation of the developers are as follows.

| | |
|---|---|
| Toner | 5 |
| Ferrite carrier coated with a silicone resin (thickness of the silicone layer is 0.3 μm, and the average particle diameter of the ferrite carrier is 50 μm.) | 100 |

(2) Running Test

The four color developers were set in a full color laser copier Imagio Color 2800 manufactured by Ricoh Co., Ltd. In the copier, four color toner images were formed one by one on a drum-shaped photoreceptors using a developing device having four color developing sections. The developing method was a reverse developing method. The color toner images were transferred one by one to an intermediate transfer medium to form a full color image thereon. The full color image was then transferred on a receiving material.

The evaluation items are the same as those of the evaluation method A. The results are also shown in Table 2.

TABLE 2

| | Image density | Reproducibility of fine line image | Background fouling | Half tone reproducibility | Image omission |
|---|---|---|---|---|---|
| Ex. 10 | 1.91 | 4 | 5 | 5 | 4 |
| Ex. 11 | 2.08 | 5 | 4 | 4 | 5 |

Preparation of Black Mother Toner (2)

The following components were mixed and agitated in a flasher.

| | |
|---|---|
| Water | 1200 |
| Phthalocyanine Green aqueous cake (solid content of 30%) | 200 |
| Carbon black (Tradenamed as MA60 and manufactured by Mitsubishi Chemical Corp.) | 540 |

Then 1200 parts of an epoxypolyol resin having a number average molecular weight Mn of 3800, a ratio Mw/Mn of 3.9, and a glass transition temperature Tg of 59° C. were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Thus a black pigment master batch was prepared.

The following components were mixed.

| | |
|---|---|
| The epoxypolyol resin mentioned above | 100 |
| The black pigment master batch prepared above | 8 |
| Charge controlling agent (zinc salicylate derivative) (tradenamed as Bontron E-84 and manuactured by Orient Chemical Co., Ltd.) | 2 |

The mixture was melted and kneaded by a two-roll mill. Then the mixture was cooled by rolling. The mixture was pulverized and classified.

Thus, two kinds of black mother toners having a weight average particle diameter of 8.5 $\mu$m and spherical degrees of 0.92 and 0.94, respectively, were prepared.

Preparation of Yellow Mother Toner (2)

The following components were mixed and agitated in a flasher.

| | |
|---|---|
| Water | 600 |
| Pigment Yellow 17 aqueous cake (solid content of 50%) | 1200 |

Then 1200 parts of the epoxypolyol resin mentioned above were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a yellow pigment master batch was prepared.

The following components were mixed.

| | |
|---|---|
| The epoxypolyol resin mentioned above | 100 |
| The yellow pigment master batch prepared above | 8 |
| Charge controlling agent (zinc salicylate derivative) (Bontron E-84) | 2 |

The mixture was melted and kneaded by a two-roll mill. Then the mixture was cooled by rolling. The mixture was pulverized and air-classified in the same way as performed in the black toner preparation.

Thus, two kinds of yellow mother toners having a weight average particle diameter of 8.5 $\mu$m and spherical degrees of 0.92 and 0.94, respectively, were prepared.

Preparation of Magenta Mother Toner (2)

The following components were mixed and agitated in a flasher.

| | |
|---|---|
| Water | 600 |
| Pigment Red 57 aqueous cake (solid content of 50%) | 1200 |

Then 1200 parts of the epoxypolyol resin mentioned above were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a magenta pigment master batch was prepared.

The following components were mixed.

| | |
|---|---|
| The epoxypolyol resin mentioned above | 100 |
| The magenta pigment master batch prepared above | 8 |
| Charge controlling agent (zinc salicylate derivative) (Bontron E-84) | 2 |

The mixture was melted and kneaded by a two-roll mill. Then the mixture was cooled by rolling. The mixture was pulverized and air-classified in the same way as performed in the black toner preparation.

Thus, two kinds of magenta mother toners having a weight average particle diameter of 8.5 $\mu$m and spherical degrees of 0.92 and 0.94, respectively, were prepared.

Preparation of Cyan Mother Toner (2)

The following components were mixed and agitated in a flasher.

| | |
|---|---|
| Water | 600 |
| Pigment Blue 15:3 aqueous cake (solid content of 50%) | 1200 |

Then 1200 parts of the epoxypolyol resin mentioned above were added to the mixture, and kneaded at 150° C. for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a cyan pigment master batch was prepared.

The following components were mixed.

| | |
|---|---|
| The epoxypolyol resin mentioned above | 100 |
| The cyan pigment master batch prepared above | 8 |
| Charge controlling agent (zinc salicylate derivative) (Bontron E-84) | 2 |

The mixture was melted and kneaded by a two-roll mill. Then the mixture was cooled by rolling. The mixture was pulverized and air-classified in the same way as performed in the black toner preparation.

Thus, two kinds of cyan mother toners having a weight average particle diameter of 8.5 $\mu$m and spherical degrees of 0.92 and 0.94, respectively, were prepared.

Example 12

One hundred (100) parts of each of the above-prepared four mother toners (2) having a spherical degree of 0.92 were mixed with 0.75 parts of the external additive C using a Henshel mixer. The mixture was sieved using a screen having openings of 50 $\mu$m to remove coarse particles.

Thus, four color toners of Example 12 were prepared.

Five parts of each of the toners was mixed with a ferrite carrier, which has an average particle diameter of 50 $\mu$m and on which a silicone resin is formed in an average thickness of 0.3 $\mu$m, using a TURBULA mixer to prepare four color developers.

Example 13

The procedures for preparation of the color toners and developers in Example 12 were repeated except that the external additive was changed to the external additive D.

Thus, four color developers of Example 13 were prepared.

Example 14

The procedures for preparation of the color toners and developers in Example 12 were repeated except that the external additive was changed to the external additive E.

Thus, four color developers of Example 14 were prepared.

Example 15

The procedures for preparation of the color toners and developers in Example 12 were repeated except that the external additive was changed to the external additive F.

Thus, four color developers of Example 15 were prepared.

Example 16

The procedures for preparation of the color toners and developers in Example 13 were repeated except that the color toners having a spherical degree of 0.94 were used and the addition amount of the external additive was 0.50.

Thus, four color developers of Example 16 were prepared.

Example 17

The procedures for preparation of the color toners and developers in Example 12 were repeated except that the external additive was changed to the external additive G.

Thus, four color developers of Example 17 were prepared.

Example 18

The procedures for preparation of the color toners and developers in Example 12 were repeated except that the color toners having a spherical degree of 0.94 were used and the formulation of the external additive was changed as follows.

| | |
|---|---|
| The external additive D | 0.5 |
| External additive X | 0.25 |

The external additive X was prepared by treating the silica used for the external additive A with hexamethylenedisilazane.

Thus, four color developers of Example 18 were prepared.

Comparative Example 3

The procedures for preparation of the color toners and developers in Example 12 were repeated except that the external additive C was replaced with 1.0 part of a silica.

Comparative Example 4

The procedures for preparation of the color toners and developers in Example 12 were repeated except that the external additive C was replaced with 0.75 part of a silica.

Evaluation Method D

Each of the developer combinations of Examples 12 to 18 and Comparative Examples 3 and 4 was set in an image forming apparatus DCP32D manufactured by XEIKON Co., which uses a paper-drive image transfer method as shown in FIG. 1 and a non-contact heat fixing method (i.e., an oven fixing method) as shown in FIG. 2. The fixing temperature was 140° C.

The image forming operations were performed at a speed of 35 ppm (A4 size) or 15 ppm.

The evaluation items are as follows.

a) Image omissions

Image omissions of the images were evaluated in the same method mentioned above.

b) Gloss of image

The images were observed to classify the gloss thereof into five grades. Grade 5 is the best (i.e., glossy).

The results are shown in Table 3.

TABLE 3

| | Image omissions | Gloss | Image forming speed (ppm) |
|---|---|---|---|
| Ex. 12 | 5 | 4 | 35 |
| Ex. 13 | 5 | 4 | 35 |
| Ex. 14 | 4 | 4 | 35 |
| Ex. 15 | 3 | 4 | 35 |
| Ex. 16 | 5 | 5 | 35 |
| Ex. 17 | 5 | 4 | 35 |
| Ex. 18 | 5 | 4 | 35 |
| Comp. Ex. 3 | 2 | 3 | 15 |
| Comp. Ex. 4 | 1 | 4 | 15 |

In addition, the developers of Examples 12 to 18 could produce images having good dot reproducibility.

As can be understood from Table 3, the toner of the present invention can produce good images without image omissions even when used for image forming apparatus having a paper-drive transfer method and a non-contact heat fixing method. In addition, the color toners of Example 16 which has a spherical degree of 0.94 can produce good images having good gloss.

As mentioned above, by using a particulate inorganic material which is treated with a silicone oil and which has a specific free silicone degree as an external additive to a toner, the resultant toner can produce good images without image omissions even when used for long period of time and for an image forming method using a paper-drive transfer method and a non-contact heat fixing method.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 2000-129240, 2000-133850 and 2000-299739, filed on April 28, May 2, and September 29, respectively, the entire contents of which are herein incorporated by reference.

What is claimed is:

1. An external additive for a toner, comprising:
   a particulate inorganic material; and
   a silicone oil,
wherein the silicone oil is present on the particulate inorganic material in an amount of Ws by weight and present as a free silicone oil in an amount of Wfs by weight, and wherein a free silicone degree defined as a ratio Wfs/Ws is from 10 to 70%.

2. The external additive according to claim 1, wherein the free silicone degree is from 30 to 50%.

3. The external additive according to claim 1, wherein the particulate inorganic material is selected from the group consisting of silica, titanium oxide and combinations thereof.

4. A method for preparing an external additive comprising:
   coating a particulate inorganic material with a silicone oil; and heating the inorganic material,
wherein after the heating the silicone oil is present on the particulate inorganic material in an amount of Ws by weight and present as a free silicone oil in an amount of Wfs by weight, and a free silicone degree defined as a ratio Wfs/Ws is from 10 to 70%.

5. The method according to claim 4, wherein the coating is performed while the heating is performed.

6. The method according to claim 4, wherein the heating is performed after the coating is performed.

7. A toner comprising:
   a binder resin;
   a colorant; and
   an external additive,
wherein the external additive comprises:
   a particulate inorganic material; and
   a silicone oil,
wherein the silicone oil is present on the particulate inorganic material in an amount of Ws by weight and present as a free silicone oil in an amount of Wfs by weight, and wherein a free silicone degree defined as a ratio Wfs/Ws is from 10 to 70%.

8. The toner according to claim 7, wherein the free silicone degree is from 30 to 50%.

9. The toner according to claim 7, wherein the particulate inorganic material is selected from the group consisting of silica, titanium oxide and combinations thereof.

10. The toner according to claim 7, wherein the toner has a weight average particle diameter not greater than 15 μm.

11. The toner according to claim 7, further comprising another inorganic external additive having a number average particle diameter less than the number average particle diameter of the particulate inorganic material.

12. The toner according to claim 7, further comprising a particulate resin serving as another external additive, wherein the particulate resin has a number average particle diameter greater than the number average particle diameter of the particulate inorganic material.

13. The toner according to claim 7, wherein the toner has a spherical degree not less than 0.93.

14. The toner according to claim 7, wherein the toner is used for an image forming method comprising a non-contact heat fixing method.

15. The toner according to claim 7, wherein the toner is used for an image forming method comprising a paper-driven image transferring method.

16. The toner according to claim 7, further comprises a magnetic material.

17. A toner combination for forming a full color image, consisting of a cyan toner, a magenta toner, a yellow toner and a black toner, wherein at least one of the toners comprises:
   a binder resin;
   a colorant; and
   an external additive,
wherein the external additive comprises:
   a particulate inorganic material; and
   a silicone oil,
wherein the silicone oil is present on the particulate inorganic material in an amount of Ws by weight and present as a free silicone oil in an amount of Wfs by weight, and wherein a free silicone degree defined as a ratio Wfs/Ws is from 10 to 70%.

18. The toner combination according to claim 17, wherein the free silicone degree is from 30 to 50%.

19. The toner combination according to claim 17, wherein the particulate inorganic material is selected from the group consisting of silica, titanium oxide and combinations thereof.

20. The toner combination according to claim 17, wherein the toner combination is used for an image forming method comprising a non-contact heat fixing method.

21. The toner combination according to claim 17, wherein the toner combination is used for an image forming method comprising a paper-drive image transferring method.

22. A two component developer comprising:
   a magnetic carrier; and
   the toner according to claim 7.

23. A toner container containing the toner according to claim 7.

24. A toner container containing the two component developer according to claim 22.

25. An image forming method comprising:
   developing an electrostatic latent image on an image bearing member with a developer comprising a toner to form a toner image thereon; and
   transferring the toner image onto a receiving material, wherein the toner is the toner according to claim 7.

26. The image forming method according to claim 25, wherein the developer is the two component developer according to claim 22.

27. The image forming method according to claim 25, wherein the transferring is performed upon application of pressure to the receiving material.

28. The image forming method according to claim 25, further comprising fixing the toner image on the receiving material by a non-contact heating method.

29. The image forming method according to claim 25, wherein the transferring is performed while the image bearing member is driven by a paper-drive method.

30. The image forming method according to claim 25, further comprising:
   repeating the developing and transferring using plural color developers each including a different color toner to form a full color image on the receiving material, wherein each of the plural color toners is a toner according to claim 7.

31. An image forming method comprising:
   developing an electrostatic latent image formed on an image bearing member with a color developer comprising a color toner to form a color toner image on the image bearing member;
   transferring the color toner image on the image bearing member onto a receiving material upon application of pressure to the receiving material; and
   repeating the electrostatic latent image developing step and the color toner transferring step plural times using plural different color developers each including a different color toner to form a full color toner image on the receiving material, wherein each of the different color toners is a toner according to claim 7.

32. The image forming method according to claim 31, wherein the developing is performed by a developing device having plural color developing sections, wherein each of the plural color developing sections comprises one of the plural color developers, a developing roller and a regulating blade, wherein the developing further comprises:
   forming a layer of each of the respective plural color developers on the respective developing roller using the respective regulating blade; and
   contacting the layer with the electrostatic latent image to form the color toner image on the image bearing member.

33. The image forming method according to claim 31, further comprising:

fixing the full color image on the receiving material by a non-contact heat fixing method.

34. The image forming method according to claim 31, wherein the transferring is performed while the image bearing member is driven by a paper-drive method.

35. An image forming method comprising:

developing an electrostatic latent image formed on an image bearing member with a color developer comprising a color toner to form a color toner image on the image bearing member;

first transferring the color toner image on the image bearing member onto an intermediate transfer medium upon application of pressure thereto;

repeating the electrostatic latent image developing step and the first color toner transferring step plural times using plural different color developers each including a different color toner to form a full color toner image on the intermediate transfer medium; and second transferring the full color image onto a receiving material, wherein each of the different color toners is a toner according to claim 7.

36. The image forming method according to claim 35, wherein the developing is performed by a developing device having plural color developing sections, wherein each of the plural color developing sections comprises one of the plural color developers, a developing roller and a regulating blade, wherein the developing further comprises:

forming a layer of each of the respective plural color developers on the respective developing roller using the respective regulating blade; and contacting the layer with the electrostatic latent image to form the color toner image on the image bearing member.

37. The image forming method according to claim 35, further comprising:

fixing the full color image on the receiving material by a non-contact heat fixing method.

38. The image forming method according to claim 35, wherein the transferring is performed while the image bearing member is driven by a paper-drive method.

39. An image forming method comprising:

developing electrostatic latent images formed on plural image bearing members with plural color developers each comprising a different color toner to form a different color toner image on each of the image bearing members, respectively; and transferring the color toner images onto a receiving material one by one upon application of pressure to form a full color image thereon, wherein each of the different color toners is a toner according to claim 7.

40. The image forming method according to claim 39, wherein the transferring further comprises:

first transferring the color toner images on the image bearing members one by one onto an intermediate transfer medium upon application of pressure to form the full color image on the intermediate transfer medium; and second transferring the full color image onto the receiving material.

41. The image forming method according to claim 39, wherein the developing is performed by a developing device having plural color developing sections, wherein each of the plural color developing sections comprises one of the plural color developers, a developing roller and a regulating blade, wherein the developing further comprises:

forming a layer of each of the respective plural color developers on the respective developing roller using the respective regulating blade; and contacting the respective layer with the respective electrostatic latent image to form the different color toner image on each of the image bearing members.

42. The image forming method according to claim 39, further comprising:

fixing the full color image on the receiving material by a non-contact heat fixing method.

43. The image forming method according to claim 39, wherein the transferring is performed while the image bearing member is driven by a paper-drive method.

44. An electrophotographic image forming apparatus comprising:

an image bearing member which bears an electrostatic latent image;

a developing device which develops the latent image with a developer comprising a toner to form a toner image on the image bearing member; and a toner container containing the developer therein;

wherein the toner is the toner according to claim 7.

* * * * *